US009471293B1

(12) United States Patent
Carter et al.

(10) Patent No.: US 9,471,293 B1
(45) Date of Patent: Oct. 18, 2016

(54) SYSTEM AND METHOD FOR ADMINISTERING PLUGGABLE USER INTERACTIVE SYSTEM APPLICATIONS

(75) Inventors: Joseph Carter, Cheshire (GB); Robert Allan, Cheadle (GB)

(73) Assignee: Intervoice Limited Partnership, Reno, NV (US)

( * ) Notice: Subject to any disclaimer, the term of this patent is extended or adjusted under 35 U.S.C. 154(b) by 1025 days.

(21) Appl. No.: 12/837,771

(22) Filed: Jul. 16, 2010

Related U.S. Application Data

(63) Continuation of application No. 11/207,609, filed on Aug. 19, 2005, now Pat. No. 7,797,636.

(51) Int. Cl.
*G06F 9/445* (2006.01)

(52) U.S. Cl.
CPC .. *G06F 8/60* (2013.01); *G06F 8/61* (2013.01)

(58) Field of Classification Search
CPC .................................. G06F 8/60; G06F 8/61
USPC ......................................................... 717/174
See application file for complete search history.

(56) References Cited

U.S. PATENT DOCUMENTS

| 4,905,181 A | | 2/1990 | Gregory |
| 5,327,529 A | | 7/1994 | Fults et al. |
| 5,485,370 A | * | 1/1996 | Moss et al. .................... 709/217 |
| 5,608,789 A | * | 3/1997 | Fisher et al. ............. 379/201.03 |
| 5,696,961 A | | 12/1997 | Briscoe et al. |
| 5,870,727 A | | 2/1999 | St. Jacques et al. |
| 5,883,939 A | | 3/1999 | Friedman et al. |
| 5,896,491 A | | 4/1999 | Englefield |
| 5,909,689 A | | 6/1999 | Van Ryzin |
| 5,920,725 A | | 7/1999 | Ma et al. |
| 5,920,870 A | | 7/1999 | Briscoe et al. |
| 6,014,502 A | | 1/2000 | Moraes |
| 6,018,571 A | * | 1/2000 | Langlois et al. ......... 379/201.04 |
| 6,182,056 B1 | | 1/2001 | St. Jacques et al. |
| 6,192,514 B1 | | 2/2001 | Lurndal |
| 6,256,676 B1 | | 7/2001 | Taylor et al. |
| 6,279,016 B1 | | 8/2001 | De Vorchik et al. |
| 6,282,711 B1 | | 8/2001 | Halpern |

(Continued)

FOREIGN PATENT DOCUMENTS

| EP | 1 403 763 | 3/2004 |
| WO | WO 2005/062175 | 7/2005 |

OTHER PUBLICATIONS

Final Office Action issued against U.S. Appl. No. 11/749,983 dated Jul. 22, 2010.

(Continued)

*Primary Examiner* — Li B Zhen
*Assistant Examiner* — Bradford Wheaton
(74) *Attorney, Agent, or Firm* — Crowe & Dunlevy, P.C.

(57) ABSTRACT

Systems and methods are described that allow for multiple pluggable user interactive system (UIS) applications to be added or removed from a UIS system while maintaining controlled access by users to each currently available application. Users can access the system using multimedia connections, such as voice, text, video, web, etc., and users have access to certain subsets of the available applications depending on their identity. In addition, users can define their own preferences, which places restrictions on which applications they can access from which media. In operation, the system provides the access restrictions and navigation for the applications outside of the application structure.

9 Claims, 6 Drawing Sheets

(56) References Cited

U.S. PATENT DOCUMENTS

| | | |
|---|---|---|
| 6,289,382 B1 | 9/2001 | Bowman-Amuah |
| 6,330,554 B1 | 12/2001 | Altschuler et al. |
| 6,424,988 B2 | 7/2002 | Lurndal |
| 6,430,609 B1 | 8/2002 | Dewhurst et al. |
| 6,434,568 B1 | 8/2002 | Bowman-Amuah |
| 6,438,594 B1 | 8/2002 | Bowman-Amuah |
| 6,446,113 B1 | 9/2002 | Ozzie et al. |
| 6,484,180 B1 | 11/2002 | Lyons et al. |
| 6,487,277 B2 | 11/2002 | Beyda et al. |
| 6,559,773 B1 | 5/2003 | Berry |
| 6,601,234 B1 | 7/2003 | Bowman-Amuah |
| 6,606,660 B1 | 8/2003 | Bowman-Amuah |
| 6,611,898 B1 | 8/2003 | Slattery et al. |
| 6,615,253 B1 | 9/2003 | Bowman-Amuah |
| 6,629,129 B1 | 9/2003 | Bookspan et al. |
| 6,633,315 B1 | 10/2003 | Sobeski et al. |
| 6,640,249 B1 | 10/2003 | Bowman-Amuah |
| 6,658,466 B1 | 12/2003 | Ellestad et al. |
| 6,665,725 B1 | 12/2003 | Dietz et al. |
| 6,738,975 B1 | 5/2004 | Yee et al. |
| 6,891,552 B1 | 5/2005 | Bush |
| 6,920,607 B1 | 7/2005 | Ali et al. |
| 6,948,135 B1 | 9/2005 | Ruthfield et al. |
| 7,027,975 B1 | 4/2006 | Pazandak et al. |
| 7,379,455 B2 * | 5/2008 | Pickett ......................... 370/389 |
| 7,409,344 B2 | 8/2008 | Gurram et al. |
| 7,614,014 B2 | 11/2009 | Burgin et al. |
| 2002/0002688 A1 | 1/2002 | Gregg et al. |
| 2002/0040352 A1 | 4/2002 | McCormick |
| 2002/0049914 A1 | 4/2002 | Inoue et al. |
| 2002/0146668 A1 | 10/2002 | Burgin et al. |
| 2003/0005432 A1 | 1/2003 | Ellis et al. |
| 2003/0023700 A1 | 1/2003 | Swinton et al. |
| 2003/0171944 A1 | 9/2003 | Fine et al. |
| 2004/0073431 A1 | 4/2004 | Galanes et al. |
| 2004/0098253 A1 | 5/2004 | Balentine et al. |
| 2004/0113938 A1 | 6/2004 | Akerfeldt |
| 2004/0193420 A1 | 9/2004 | Kennewick et al. |
| 2004/0230636 A1 | 11/2004 | Masuoka et al. |
| 2005/0050301 A1 | 3/2005 | Whittle et al. |
| 2005/0183061 A1 | 8/2005 | Papanikolaou et al. |
| 2005/0216847 A1 | 9/2005 | Zhu et al. |
| 2005/0232399 A1 | 10/2005 | Vas et al. |
| 2005/0266879 A1 | 12/2005 | Spaur et al. |
| 2006/0083171 A1 | 4/2006 | Tanaike et al. |
| 2006/0117264 A1 | 6/2006 | Beaton et al. |
| 2006/0129601 A1 | 6/2006 | Chang et al. |
| 2006/0262752 A1 | 11/2006 | Moore et al. |
| 2007/0044026 A1 | 2/2007 | Potter et al. |
| 2008/0228904 A1 * | 9/2008 | Crespo-Dubie et al. ..... 709/223 |
| 2008/0240406 A1 | 10/2008 | Akula et al. |

OTHER PUBLICATIONS

U.S. Appl. No. 11/208,028, filed Aug. 19, 2005, Potter, III et al.
U.S. Appl. No. 11/208,041, filed Aug. 19, 2005, Potter, III et al.
U.S. Appl. No. 11/749,983, filed May 17, 2005, Birch et al.
U.S. Appl. No. 12/689,782, filed Jan. 19, 2010, Elmore et al.
Extended European Search Report dated Jun. 3, 2009, for Application No. EP 06813375.
International Search Report and Written Opinion dated Jul. 26, 2007 for Application No. PCT/US2006/031331.
International Search Report and Written Opinion dated Mar. 25, 2008 for Application No. PCT/US2006/031632.
Office Action dated Jul. 17, 2007 for U.S. Appl. No. 10/825,645.
Office Action dated Jan. 15, 2008 for U.S. Appl. No. 10/825,645.
Office Action dated Jul. 11, 2008 for U.S. Appl. No. 10/825,645.
Office Action dated Feb. 5, 2009 for U.S. Appl. No. 10/825,645.
Office Action dated Jul. 23, 2009 for U.S. Appl. No. 10/825,645.
Office Action dated Feb. 3, 2011 for U.S. Appl. No. 10/825,645.
Office Action dated May 2, 2007 for U.S. Appl. No. 11/208,041.
Office Action dated Oct. 17, 2007 for U.S. Appl. No. 11/208,041.
Office Action dated Jun. 2, 2008 for U.S. Appl. No. 11/208,041.
Office Action dated Nov. 13, 2008 for U.S. Appl. No. 11/208,041.
Office Action dated Jul. 24, 2009 for U.S. Appl. No. 11/749,983.
Office Action dated Feb. 3, 2010 for U.S. Appl. No. 11/749,983.
Office Action dated May 16, 2011 for U.S. Appl. No. 12/055,712.

* cited by examiner

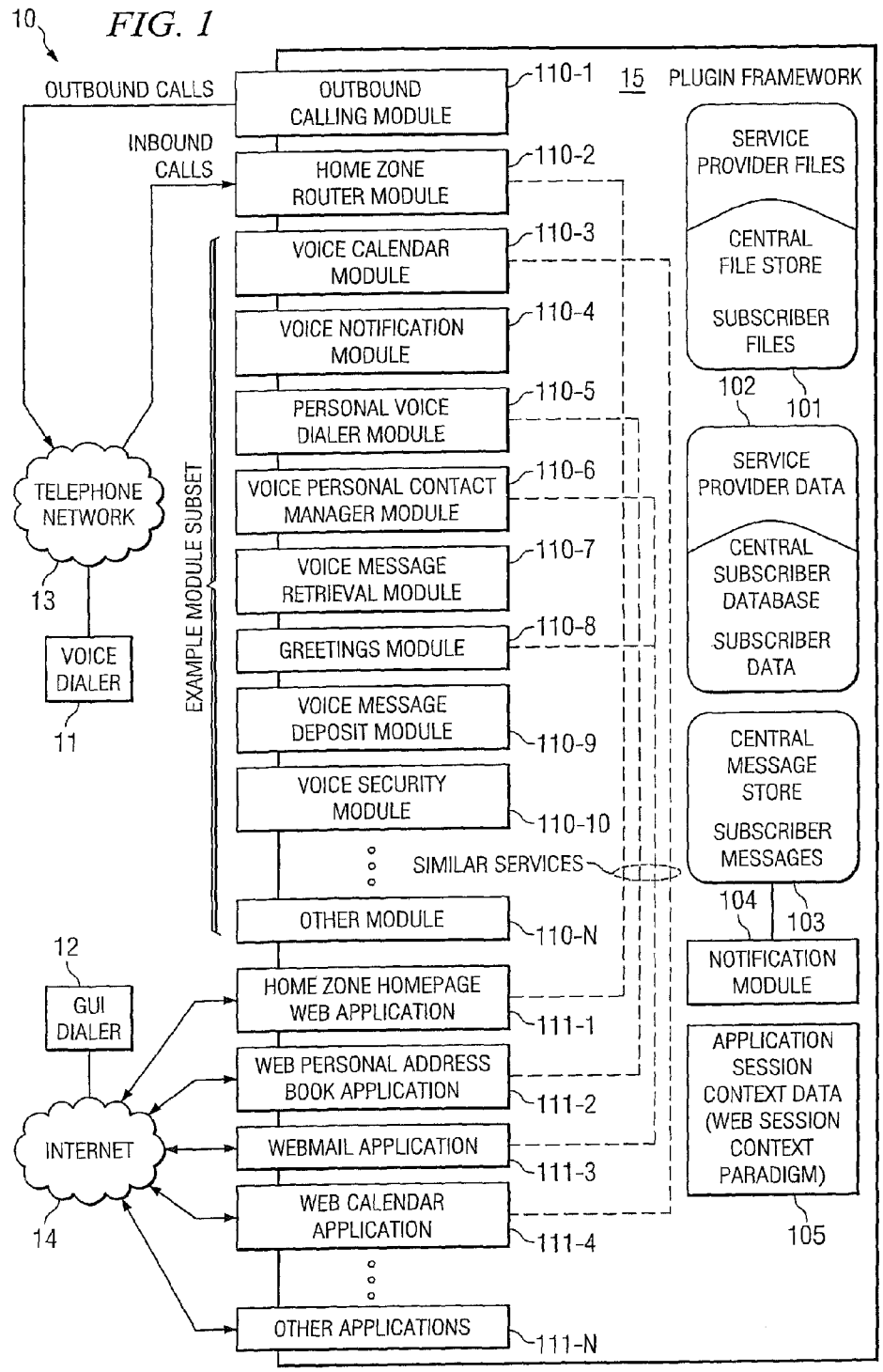

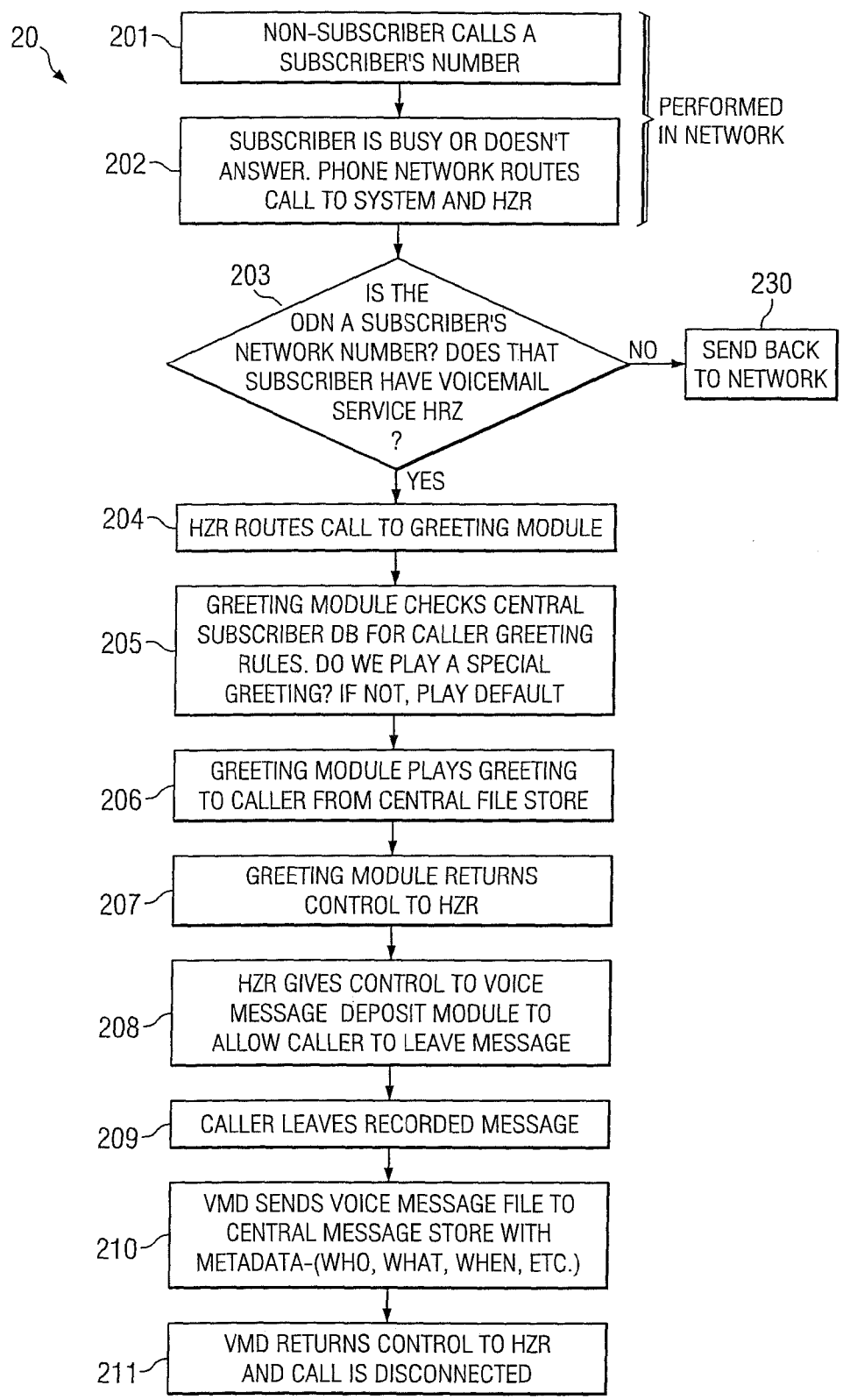

SYSTEM AND METHOD FOR ADMINISTERING PLUGGABLE USER INTERACTIVE SYSTEM APPLICATIONS

CROSS-REFERENCE TO RELATED APPLICATIONS

The present application is a continuation of U.S. Non-Provisional patent application Ser. No. 11/207,609, filed Aug. 19, 2005, entitled "System and Method for Administering Pluggable User Interactive System Applications." The present application is related to co-pending, and commonly-assigned U.S. patent application Ser. No. 11/208,028, entitled "SYSTEM AND METHOD FOR INHERITANCE OF ADVERTISED FUNCTIONALITY IN A USER INTERACTIVE SYSTEM," and U.S. patent application Ser. No. 11/208,041, entitled "SYSTEM AND METHOD FOR SHARING ACCESS TO SERVICE PROVIDER CONTROLS AND SUBSCRIBER PROFILE DATA ACROSS MULTIPLE APPLICATIONS IN A USER INTERACTIVE SYSTEM." The disclosures of each of the above identified applications are hereby incorporated herein by reference.

TECHNICAL FIELD

This invention relates to user interactive systems (UIS) and more particularly to methods for installing and administering pluggable applications in such systems.

BACKGROUND OF THE INVENTION

In "open" computing systems there is a need from time to time to add and remove applications available from various application design vendors without requiring pre-knowledge of each of the applications while still allowing the applications to co-operate such that the overall system remains functional and also to allow communication between these applications. For example, in interactive voice response (IVR) applications there are many 'routine', or infrastructure, operations that must be performed on every connection. Some of these infrastructure type operations are, for example, identifying and authenticating the caller, applying ring tone, applying ring-back tone, detecting answer, detecting that a called party is busy, call supervision, connection tear down, etc. While these common operations are routine and repetitive in nature they are not necessarily easy to create or manage for those not familiar with the communication network. In addition, some applications may or may not be present depending on the features that have been plugged into the system. The system must be able to cope with this and provide methods for applications to query what applications are available.

In particular, in IVR applications it is desired to maintain common language and common prompts across applications, and it is imperative that the interaction between the user and the application be consistent across all the available applications. Also, when applications are designed by different vendors, i.e., in a pluggable environment, the application designer (vendor) does not know what group (or sub groups) of menu items a particular user might want, or be entitled to. This then leads to inconsistency across pluggable applications from different vendors. Thus, if different users are allowed access to different applications (or different features of an application), then each user's menu must be changed in accordance with which applications are selected to be available to the user. Again, this presents a problem when the applications are not designed by a common entity. This requires some method by which an application can be added to a system so that the existing prompts and menu structures remain valid.

Another problem exists in that different users prefer to have different sets of applications. Thus, some users always want their banking prompts to start with a request for a banking balance because that user typically does not use the IVR system for banking functions other than to obtain a balance. Similarly, a user calling an airline, for example, might always wish to hear the gate number of any departing flight he or she is booked on for that day while another caller may always wish to be given arrival times of certain flights. Other users may wish to be able to find both their bank balance and gate number via the same phone number and navigate to the information they desire.

Another problem for telephone users is the fact that the interface from different vendor's applications often result in different and often confusing user instructions. For example, one application might require a user to input a "1" to signify agreement, while another application might require the user to input a "1" followed by a "#" before it will recognize the "1". Other applications might want the user to say "yes" while still other applications might want the user to say "accept" instead of "yes". Some applications desire numbers, such as credit and numbers, to be input with spaces while others will not accept spaces. While seemingly trivial, these differences compound to make system navigation difficult. Problems similar to these have been addressed in U.S. Pat. No. 6,246,989, where device specific functions are provided to a user depending, in part, upon the context of the user's device at the time of the prompt.

Additional problems exist when it is required to bill customers for use of various services. Adding such billing control to an individual application adds a high amount of sophistication and logistics to an already complicated application.

SUMMARY OF THE INVENTION

Systems and methods are described that allow for multiple pluggable user interactive system (UIS) applications to be added or removed from a system. When an application is plugged into the system it is "registered" and its availability and methods for access navigation "advertised". A shared class of service (COS) data access allows (or prevents) users (or service subscribers) access to the various registered applications. Users can have access to certain subsets of the available applications depending on their identity and class of service. When a new application is placed into the system, the system can automatically update the navigational menu to reflect the new choices available in the added application. In addition, users can define their own preferences, which will place even more restrictions on which applications they can access. In operation, the system provides the access restrictions and navigation for the applications outside of the application structure.

In one embodiment, access to an application is controlled by the user's COS. This access can be reduced by a user, if desired, consistent with the user's COS. The COS of a user is shared among all applications regardless of the application designer or when the application becomes plugged-in (registered) to the system.

The architecture allows an administrator to define call types or web session types and multiple classes of service. Then a system administrator can assign each application to a call or session type, and assign each user to a class of service (COS). Once each application has a call type, and each user has a COS, an administrator can configure which call types get assigned to what, thus defining what set of applications each user will have access to when a call is received of a given call type. In one embodiment, different triggers can be used to define class of service. For example, all users calling into a specific number can be assigned a specific class of service. In addition to the administrative configuration, the user can establish preferences, depending upon the user's class of service. This allows the user to further restrict the applications that they have access to.

A feature of the system is that users can come into the system using different methods or media. Users could call in using a telephone (wireless or wire line), and features will be presented to the phone user using voice menus. Users can access the system using the web, and features will be presented to the user using graphical icons. Users can access the system using a PDA, or other device, and features will be presented using text menus and/or icons and voice in some cases.

Another feature of the invention is that the application developer can control the connection setup script that is to be followed for each new connection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 illustrates one embodiment of a functional block diagram of a sample implementation of a user interactive system of the present invention;

FIGS. 2A and 2B illustrate one embodiment of a sample flowchart of system operation during a call to a service within this infrastructure;

DETAILED DESCRIPTION

Figure 2B:
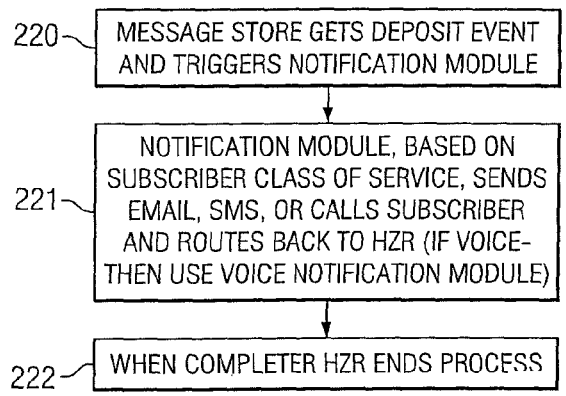

FIG. 1, illustrates one embodiment 10 of a user interactive system having plug and play modules (applications), such as modules 110-1 through 110-N, and modules 111-1 through 111-N, available for use in providing interactive services for users. In the embodiment shown, voice and DTMF and other analog interactions are handled from users 11 and telephone network 13 while users with graphical devices (typically using a GUI interface) interact with system 10 via a digital packet network, such as Internet 14.

Users can access the UIS using a variety of interactive devices, such as, for example, telephone using voice, MF or other inputs, computer, PDA, etc., using a web browser, interactive TV, cell phone, etc.

The discussion that follows illustrates voice type applications using modules 110-1 through 110-N, but many, if not all, of the applications, including the control thereof, can be accomplished by appropriate interface applications 111-1 through 111-4.

System 10 is designed to allow applications to be added or removed from the system without prior knowledge of any other application. Thus, using the concept discussed, it is possible for different applications to be designed by different designers (and different vendors) without requiring reprogramming of any application. As will be discussed, there are at least these distinct operations, namely (1) provisioning the system for a user (or set of users); (2) advertising functionality of each application to other applications; and (3) shared access to data by all applications.

In one embodiment the infrastructure and plug-in manager provide the ability (in a well defined way and with a well defined API) for a plurality of individually designed applications to share both service provider "settings" as well as subscriber "settings", both in a non-volatile store and a volatile store. The volatile store holds session data, including single session context data and state information.

This is important when independently designed applications are to be "fused" into a single UIS. Some applications may only be functional components that many applications can share and reuse. These applications, for example, are security, address book, notification, etc. This data could be simple "control flags", such as COS or more inclusive, including which subscribers are in each COS. The same is true with subscriber profile (or preferences, settings, etc.). There is also a broader class of data, such as the AB contact information (phone numbers, email addresses, etc.) along with the speech navigation grammars to access this information by any application. The disclosure discussed voicemail, fax mail, personal voice dialer, personal contact manager, or calendar but any function is possible. Other components, such as the inbound call control provided by the home zone router (HZR) and the outbound calling module, are only representations of the types of control that can be shared. These applications handle the low level call control functions for any application.

All of this interaction with discrete and independent functions and service applications require a set of rules and infrastructure that create a standard for all developers in the environment. With these standards different applications can interact and share data (including state information) within a single web session to "fuse" together a broad service form a series of shared components. Independent applications which comply to the infrastructure and interoperate within a single web session can share their content information to whatever level suits each application.

FIGS. 1, 2A, 2B describe the overall operation of the system, including all these operations. In operation, as shown in embodiment 20, FIG. 2A, when a non-subscriber calls a subscribers number, network 13 handles the call in the traditional manner. If the called subscriber does not answer (or is busy), the network (as shown in process 202) routes the call to system 10. The incoming call is routed to module 110-2 (called the home zone router module). For ease of discussion, the home zone router (HZR) module can be thought of as a central module. Process 203 performs a series of tasks, some of which are a determination of whether an original dialed number (ODN) is a subscriber's number. If it is, then the system needs to determine if the subscriber has voicemail services.

Figure 3:
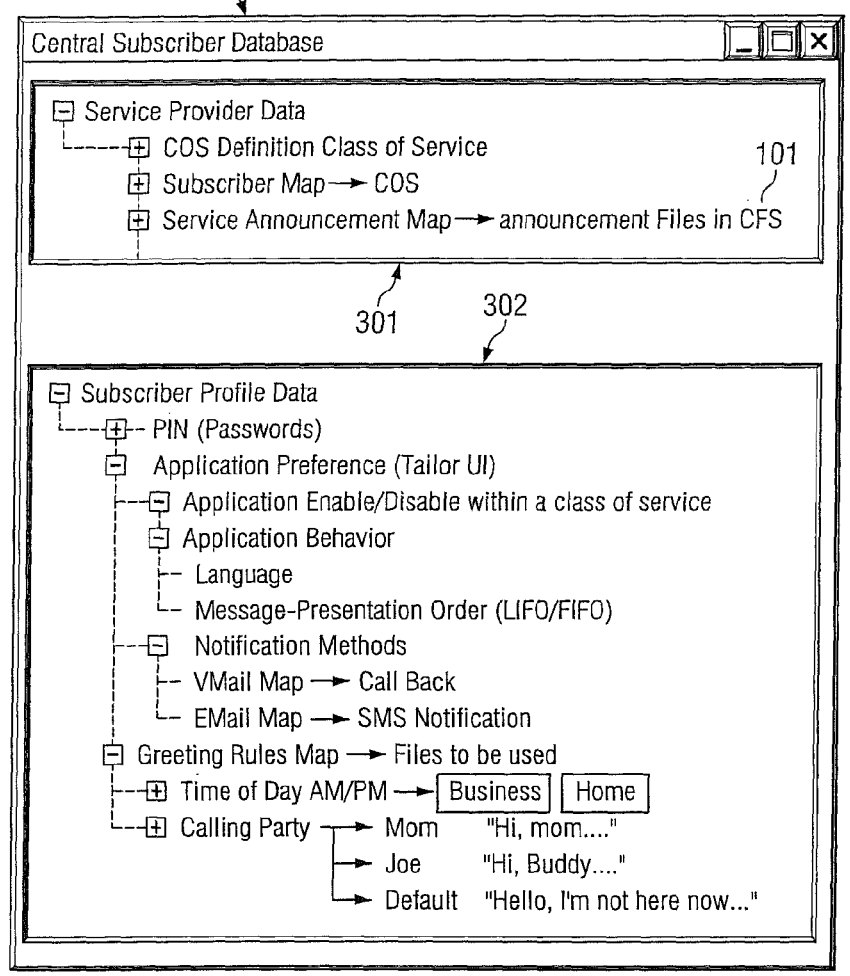
FIG. 3 illustrates one example of a central subscriber database used by all applications.

Once a positive determination is made, then the HZR module process 204, connects the call to greeting module 110-8. Greeting module 110-8, as shown by process 205, takes over control and checks central subscriber database 102 for the caller greeting rules pertaining to the called subscriber. One example of the central subscriber database is shown in FIG. 3 where section 301 is service provider data and section 302 is subscriber (profile) data. Depending on the data in section 302, process 206 plays the proper greeting as obtained from central file store 101. The files stored in the file store can be prerecorded by a professional, or by a user, and perhaps downloaded from a user's personal computer (PC).

Once greeting module 110-8 completes its task, process 207 returns control to home zone router (HZR) module 110-2 (which module acts as a control module) and process 208 gives control to voice message deposit (VMD) module 110-9 to allow the calling party to leave a message.

Process 209 receives the message and working in conjunction with process 210 stores the message in central message store 103 together with metadata pertaining to the call. The metadata can be, for example, time, calling party, length, special information, etc. When process 210 is finished, process 211 returns control back to HZR module 110-2 and the call is disconnected.

FIG. 2B illustrates the situation where, as shown in process 220, message store 103 has a message deposited (stored) therein. When this occurs, process 221, based on the subscriber's class of service, sends an email, an SMS message, or provides a voice message, indicating a message or provides the message, as desired by the user based on COS and the user's profile, as contained in central subscriber database 102 shown in FIGS. 1 and 3. If a voice call is to be made, module 110-4, in conjunction with module 110-1, are used to notify the subscriber. When the notification is complete, process 222 completes the call and the HZR ends the process.

As discussed above, all of the operations could be accomplished using applications 111-1 through 111-N, in which case home zone home page application 111-1 would perform similar to HZR 110-2. Note that the data in central file store 101, in central subscriber database 102 in central message store 103. in application session context data 105, and as well as the control processors in notification module 104, are available to all applications and modules regardless from where the information was obtained. Thus, once data is gathered from one application, whether on a session by session basis (shared context data 105), or on a more permanent basis (database store 102) that information can be shared, regardless of where an application was put into the system, and without regard to who designed the application. Also note that there are two types of data; volatile—which is kept in application session context 105 (FIG. 1), and non-volatile—which is kept in the central subscriber database 102 (FIG. 1). The volatile data includes the states of various applications, security, etc., and is similar to the web session data. The non-volatile data includes data, such as the subscriber's address book, COS data, subscribers default profile data, etc., which is kept permanently in the database. Application modules share both types of data, as discussed, in the file.

Note that while not the normal situation, there can be more than one application that can perform a specific function. In such a situation, the HZR can select which application to use for a particular function at a particular time. This selection can be made in conjunction with the user profile (such as, "always us a module from a particular vendor, if available" or "use a calendar application compatible with brand calendar").

FIG. 3 illustrates one example of a central subscriber database used by all applications. In the example, the shared service provider data contains both class of service definitions (which define the applications available in that COS) and a mapping of the subscribers to that COS. The service provider data contains other features of that COS (announcements, advertisements, outbound dialing controls, etc.) and subscriber profile or preferences data which is used to tailor the service for each subscriber under their control.

In FIG. 3, central subscriber database 102 contains service provider data 301 and subscriber profile data 302. Some of the items within section 301 are class of service (COS) definitions established as an administrator; mapping of each subscriber to a COS definition and mapping of service announcement to announcement files in CFS 101. This function allows the system administrator to control which subscribers have access to which applications. Some of the items within section 302 are subscriber PINS/Passwords; application preferences, such as, which applications a subscriber wants (or does not want) within his/her COS; language; message presentation of order (LIFO/FIFO); notification methods; greeting rules.

Using database 102, a subscriber also has freedom of choice across many applications. A subscriber can tailor the system to his/her likes and dislikes within the applications that the administrator allows the subscriber to access. The framework allows a change preference which is made while using one type of interface (i.e., phone) to appear in the same application when that application is accessed with a different interface (i.e., web).

The set of applications that are available to a subscriber during the session is determined by the HZR in association with a user's COS and his/her preferences. This list is first derived as a list of applications available via the current access method. The list is then filtered by applications allowed by the current class of service and subscriber preferences. Finally, each available application must be a valid plug-in application. Plug-in application information is accessed via plug-in manager business objects. In this manner, as applications are added (or removed) from the system, these applications become available to all users (or to other applications) without prior knowledge on the part of the system, and become added to menus when appropriate (based on class of service, user preference, etc.)

Users can select the order of the function (order of a menu) desired and once that order is established for one application, the same order will apply to all modes of accessing the same (or similar) menus, whether the access is by voice, web server, video server, etc. While the user can specify an order of a prompt, the system can also statistically determine a preferred order and then apply the "interred" order across applications and across media entry types, and across pluggable applications, all without prior knowledge among applications. Note that the statistics can be generated from a user based on calls using all media types (voice, web, video, text, graphics, etc.). Thus, if a user always asks for his/her bank balance first regardless of media type access, then the bank balance is the preferred first menu choice. However, if a user uses voice response for balances but text messaging for check listings, then the system provides balances when the user calls in via a phone, but should, provides check listings when the same user accesses the system via a web browser using text.

A shared data interface contains, in one embodiment, a set of scripts advertised as functions of plug-and-play applications and provide a method to utilize the business objects in order to interact with the data store to send or receive data.

In another embodiment, this interface is a set of scripts advertised as functions of plug-and-play applications and provide a method to interact directly with session context data 204 to send or receive data.

In yet another embodiment, this interface is a set of scripts advertised as functions of plug-and-play applications and provide a method to utilize business objects in order to interact with the data stores to receive data and then store this data in session context data 14.

In a final embodiment, this interface is a set scripts specific to individual applications which are members of applications 26 which provide an interface to interact directly with session context data in order to send or receive data which is either specific to a particular application or is shared between individual applications. Application selection grammars are used in conjunction with a selected application from the available applications where appropriate, grammars are shared between applications when appropriate.

In one embodiment, billing control is built into the shared infrastructure so that each of the applications can be tailored to a particular user and that user billed appropriately for their use without such billing control being contained in the various applications. This, then, allows a user to obtain different applications (or pieces of applications) from different vendors while receiving single unified billing.

In one embodiment, the system allows the operator to define which keys or spoken words will activate a specific application (personal definitions). This allows the operator to customize a system to their own specific requirements without requiring code changes by the vendor. Also, certain categories of choices can be made only available to certain users and perhaps only at certain times or under certain conditions. As discussed above, when a preference for a user has been established in one application that same preference is available for all applications.

The pluggable application framework described in this application provides the infrastructure in which software modules, web screens and voice scripts can be plugged into a control system for coordinated operation of common telephony control functions. This is controlled for each user by the class of service assigned to the user and by the applications assigned to a specific telephone number. The user can select as many of the features as they desire within their class of service subject to the operator mandating certain applications.

As used in this application, common telephony control functions are those functions necessary to establish a communication connection, monitor that connection, tear down the connection, and generally supervise the connection. Such telephone functions also include functions that are common to a plurality of applications whether or not those applications were designed as a unitary whole or were designed by individual entities at different times without regard to one another. Such functions include user navigation aids, such as voice, text, or graphical prompts.

The control system allows for each module to interact via a set of predefined interfaces to that each module can register itself to provide the capabilities that it adds to the system. Those capabilities (features) are assigned a class of service and are then made available to users having that class of service. Using this system, each module need not repeat the common switching and control functions necessary to control the system. Each specific application transfers to the control system any special menus or voice scripts required. This, then keeps the installation of web screens, voice prompts, and voice scripts identical (and, if desired, user specific) across many applications even though those applications were created and maintained by different providers.

Each different set of applications present different functions and different screens for use by the common application serving that application. Thus, a web server intended to allow subscribers to manage their profile, would contain subscriber web screens, profiles and software modules, but would not contain, for example, voice scripts. In operation, the control system will have several applications plugged into it in addition to a global application. The global applications are available to all the applications, and manage functions common to all the applications. These functions include access control for common data, security and file store, but could also contain some applications selectively available to users depending, for example, on user class of service.

The applications can be defined, for example, by an XML file defining the access points to the application. An application may consist of one or more software modules, such as subscriber web screens, subscriber web screen profiles, subscriber voice scripts, subscriber voice script profiles, application/module parameters, and provisioning engine modules.

The control system provides a framework for all of the software and screen components in the system. It also provides access and query methods to determine which applications are available (loaded in the system) so the system can dynamically display or play the appropriate options for a user. As discussed above, this functionality is controlled by the class of service information of a user which refines the response to the user. For example, to determine the list of options to present to a user (subscriber) on the user's home page, the list of applications associated with that user is retrieved from the common data file. The plug-in manager is then queried as to what entry points, i.e. web links are available for each of these applications. These entry points are then used to generate a menu structure that the subscriber can click on (or otherwise signify acceptance of) (either via the device the user is calling from or an auxiliary device) to access the application or application component.

Figure 4:
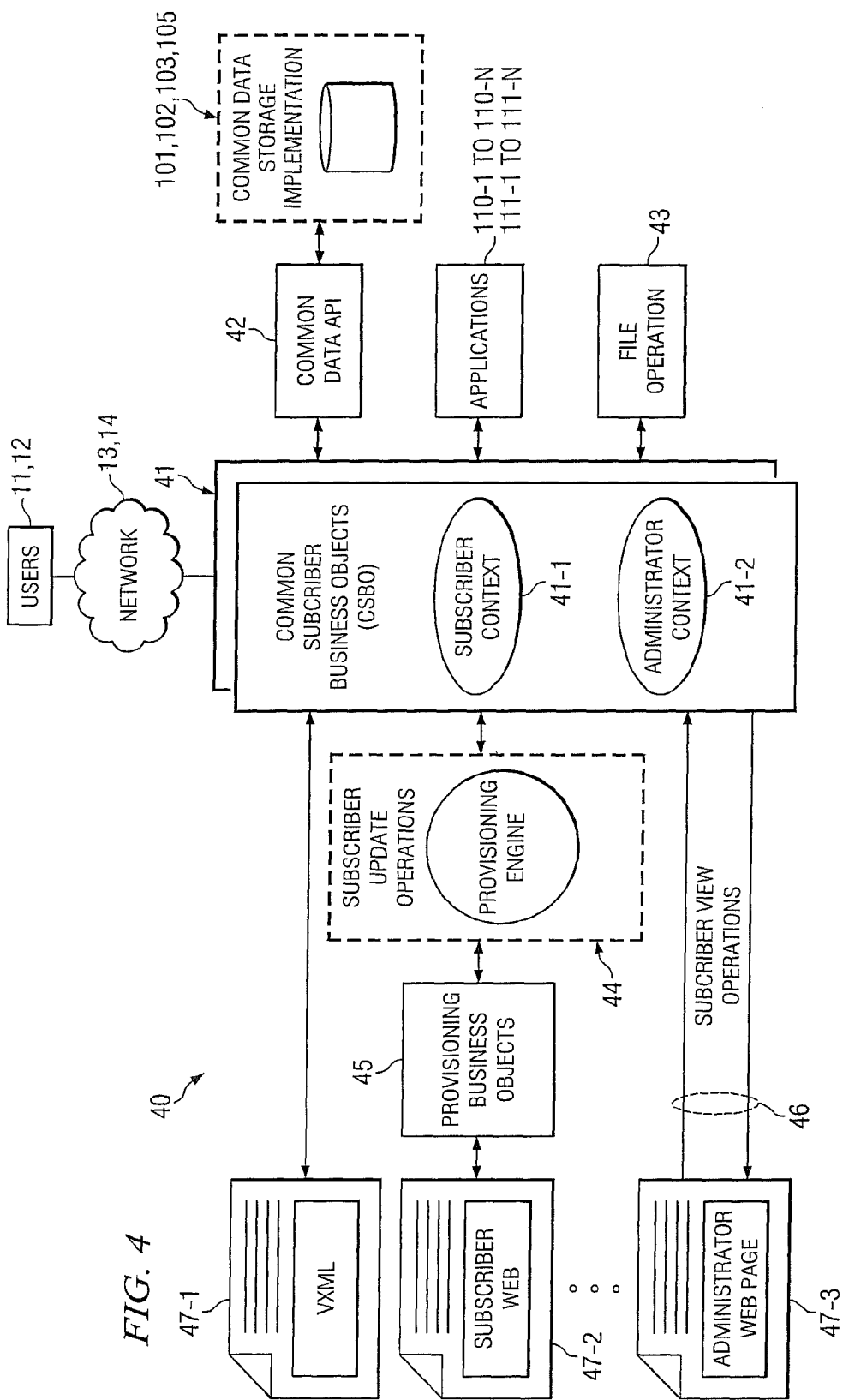
FIGS. 4 and 5 show one embodiment of the operation of a user interactive system.
Figure 5:
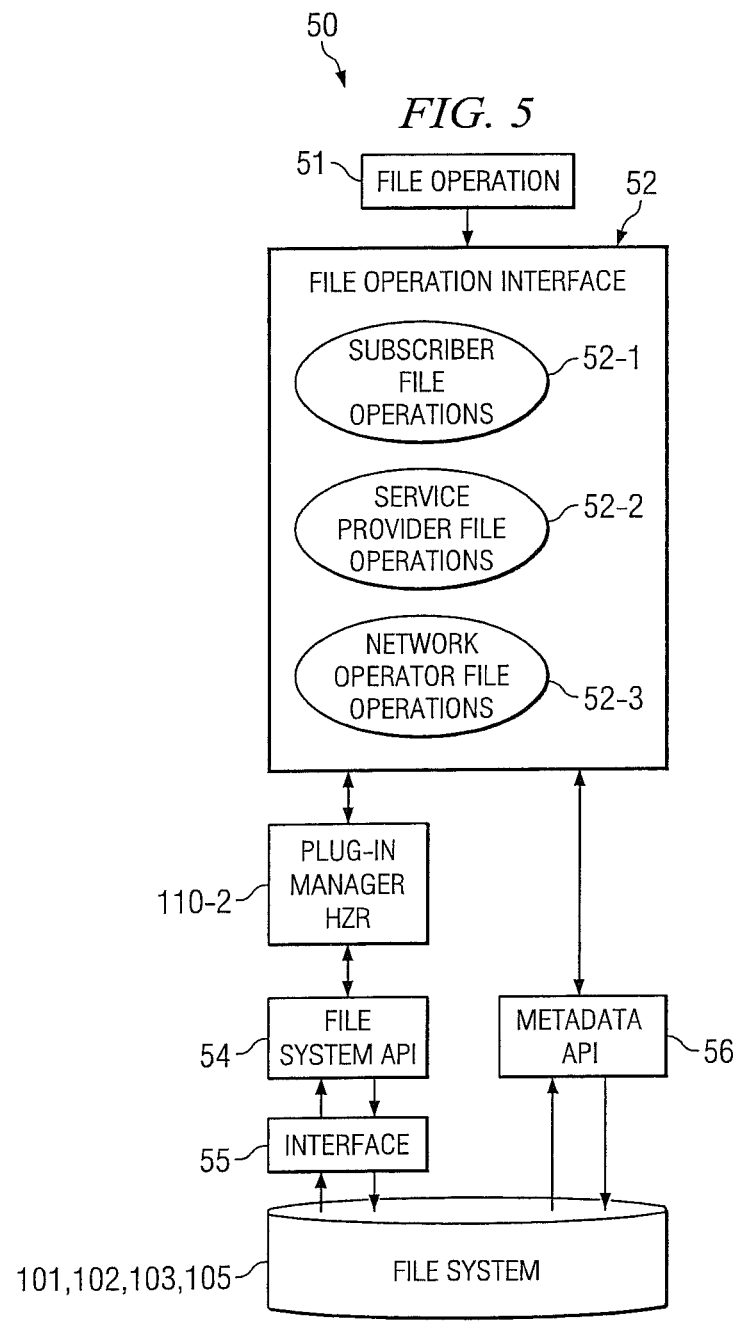

FIGS. 4 and 5 show one embodiment of the operation of a user interactive system (UIS) which highlights the users' (both service provider provisioning and subscriber profile management) interface to the services' applications and shared data. This shared data could be session context information available to all applications during a user session (volatile) or explicitly accessed from a central subscriber database via a defined API (non-volatile and persists after the session is terminated).

In FIG. 4, embodiment 40 shows users 11, 12, via network 13, 14 (as discussed above), and platform 41, accessing one or more of VXML call flow(s) 47-1, subscriber web page(s) 47-2, and/or administrator web page(s) 47-3 using the provisioning engine for subscriber COS update operations 44 via provisioning business objects 45.

Alternatively, the end-user can make a direct call to CSBO 41, for example, using VXML 47-1. The end-user can access the required common data stored in one of databases 101, 102, 103, or 105 within common data storage via CSBO 41 which acts as a central navigation controller under control of HZR 110-2 (FIG. 1), as discussed above. That access is via common data API 42. The results of the call are returned back to the end-user. This mechanism permits the replacement of one specific implementation of a software module with an alternative. This allows the system to be customized for a particular customer service provider without having to alter the core software system. This also reduces coupling within the system, hence reducing the number of faults. Each module can be tested as a unit improving the reliability of the system as more extensive tests can be carried out before integration with the overall system.

Subscriber context 41-1 and administrator context 41-2 of CSBO 41 limits certain operations such as "delete subscriber" or "change subscriber Class of Service" so that they can only be made by an administrator. However, certain operations, such as "change language" are available to the user. In general, the administrator context is an extension of the subscriber context, and allows complete control of the common subscriber data via an administrator, and limited control of the data via a subscriber. This partitions the system into user and administrative areas which reduces the risks of allowing third parties to call the system APIs. This reduces the risks of these applications introducing security holes into the system and/or damaging the system in such a way that the overall functioning is placed at risk. As discussed above, these are, for example, sections 301 and 302 of data file 102.

The context split (between subscriber and administrator) is carried forward into the data classes that represent the common data. This split enables the subscriber version of the class to access data pertaining to the class of service of the subscriber, but the subscriber cannot change its class of service. This protection is provided by a compile time check which reduces the likelihood of common data being changed without going through the correct class. It also insures that the data will be in the correct context.

Examples of the types of information a user can change are: language, web theme and time zone selection. Subscribers would not be permitted to change their class of service, create a new theme etc.

Examples of the types of information an administrator can change are: get, create, update, delete, and list class of service or create users.

File store common data storage 101, 102, 103, and 105 are core components of the open messaging framework and provide an application program interface (API) for handling files across the various modules and web screen components. The file store contains metadata associated with all the files and provides separation between subscribers, service providers and network operators. The API allows the alternate implementations of the file store to be used via the plug-in manager without affecting the user level applications.

File operation 43 consists of three interfaces to platform 41. A high level "operations" level interface that is intended for use by the applications; a metadata interface for handling the associated information within the file; and a low level, direct access layer that allows the creation, reading, appending, and deletion of files. The system has the ability to obtain, read, and write streams to/from these files.

As shown in FIG. 5, file operation 51 retrieves the appropriate instantiation of an application via interface 55 via plug-in manager 27. The file store APIs present the functionality available for the particular role it is required for. For example, an administrator can. create, retrieve, delete class of service data, but a user would only be able to read this information. An example would be defining file store quota information. The administrator could define a quota and the user level code would be able to read this quota to provide information to the user. This code would not be able to alter the quota deliberately, accidentally or as a side effect of other commands.

For each file stored in the file store, a file metadata entry will also be stored in the various databases via API 54 and API 56. File metadata details are stored for all files, mapping subscriber files to a subscriber file store table. API 54 also maps service provider 52-2 files to a service provider table, and maps network operations 52-3 to network operations files, and subscriber operation 52-1 to subscriber files, all as discussed above. The operations interface always acts on both the file store and the file meta-data entry in the file store database, providing a seamless view of the files to the application. The actual implementation of the metadata and file storage will be abstracted from the applications. Hence an initial implementation may use a relational database and a networked file system, but other systems could use, for example, companion files for the metadata. The main intention is to ensure that applications are independent from the implementation details of file end data storage.

APIs 54 and 56 also contain extensions to the common data class of service database tables, providing a 'quota' field that determines the maximum file storage quota allowed for each subscriber contained within a particular class of service.

As shown in FIG. 5, all files are stored against a subscriber, a service provider, or a network operator (general system). This allows a system to present a restricted view of the data to the user, so that they can only see their own data and not that of other users. Similarly each service provider can see their own data, but not that of other providers. This provides clear partitioning of the data to ensure privacy and security.

Metadata API 56 provides access to the database, that contains file metadata entries which provide details about each stored file. Details include each file's friendly name and description, the file type (e.g. voice, picture) and sub-type (e.g. greeting, ring tone), file size and the relative path from the context specific root directory (e.g. Subscriber files are held relative to the subscriber's root directory).

The division of file types into type and sub-type, allows applications to fine-tune the granularity at which files are used (e.g. application X may use any files of type 'picture', whereas application Y may only use files of type 'voice' that have a sub-type of 'greeting'). Additionally, type and sub-type may be used in the presentation layer to provide a view of the files as being stored in virtual 'folders'.

The file size attribute is provided to enable the system to calculate the current total used file storage quota within the file store for a particular subscriber. This value is required when creating new files, to determine that adding this new file will not exceed a subscriber's maximum file storage quota. This maximum quota is determined by the subscriber's class of service, and is stored as an extension to the common class of service table.

All class of service (COS) attributes and extensions are driven by a specific application requirement. The concept is that plug-in applications have methods to extend COS attributes to control file storage. For example; a subscriber greetings COS controls the storages of greeting messages and the amount of space allocated for such storage. The example is a message storage COS which controls the message space for voice mail, email, fax, and/or other media messages stored for each subscriber account. All these attributes should be maintained in a non-volatile memory, such as CSDB 102, FIG. 1.

Permission to delete a particular file is determined by first checking if any applications are registered users of the file. Applications may register 'usage' of a particular file via the application set stored as part of the file's metadata. If the application set indicates that a file is in use by application X, the file may be not be deleted without confirmation from the context user attempting to delete the file. If the application set indicates that no applications are registered as using the file (e.g. empty application set), the file may be deleted without any additional confirmation.

At the low level, file system API 54 consists of a file system interface, which provides access to a series of file and file stream interfaces. Requests to retrieve a file instance are handled by API 54 via interface 55 containing a framework file API which defines methods used to handle files. Requests to retrieve a file stream instance to read/write to a file are also handled by the file system interface. Each file stream interface then describes the public methods used to handle file streams.

Figure 6:
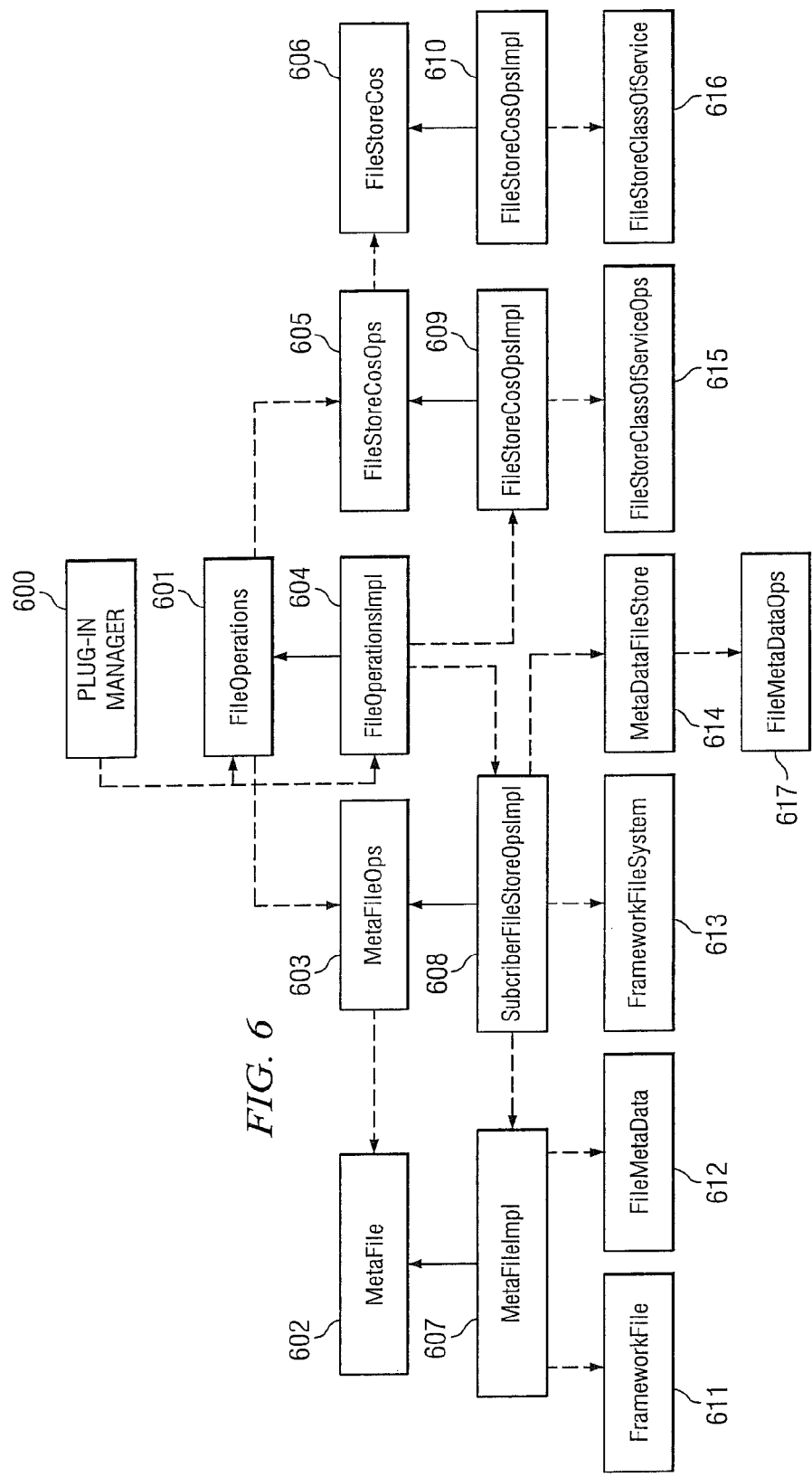
FIG. 6 illustrates one embodiment of a detailed example of interaction of the web session using a tightly classed tag library paradigm showing elements of a user interactive system.

FIG. 6 provides a data centric view of the infrastructure describing the shared data access methods (API) in the form of a class hierarchy used by the plug-in manager during system operation. FIG. 6 is best understood using a tightly classed tag library paradigm. Note that FIGS. 1 and 6 show different views of the system. FIG. 6 is a web view that looks at the system as using the web paradigm to implement the framework, while FIG. 1 is a functional block diagram view of an example service (from the user's prospective if the user could see inside).

FileOperations 601, MetaData FileStore 614, and FileSystem components (604, 605, 606, 609, 610) are initialized and subsequently retrieved from the plug-in manager which in turn receives data from such newly added application. Plug-in manager 600 is the software module that handles the plugged-in applications. The added applications contain information as to which subscribers can access the application (by class of service); and as to which common services it needs the system to perform, and under what conditions such performance will be required. This information determines the actual file store implementations, allowing an application to customize it's behavior, as required.

Plug-in manager 600 maintains a set of applications defined by XML files for the system. Each application extends the functionality of the system. The XML file describes how the application fits into the system by defining links for voice, subscriber, and administration. The links contain all the required information and alternative text for text-based browsers. It also contains details of the pluggable software modules that it uses. Finally it contains configuration information that further refines the behavior of the application.

A global file allows global configuration of an application outside of the packaged installation. This allows the application to be upgraded but to retain the customized configuration that has been setup. This also allows the standard behavior to be changed to use new software implementations.

Each software module (such as module 110-1 to 110-N, FIG. 1) can create and maintain network connections to resources required for its operation. The pluggability allows new modules to integrate with third party software without alterations to the core functionality.

Each class of service defined can contain a set of applications that are allowed, that are the default and that are mandatory for a subscriber based on that.

Each subscriber has an associated set of applications that are allowed and another set that defines their current set. The set of current applications defines the menus for the voice and web screens via the defined resources in from the applications that are plugged in. This allows the menu structures to be dynamically generated to suit each individual subscriber depending on their set of applications and the capabilities of the installed software.

The system allows the administrators to add further applications at later stages and then to assign these facilities to their chosen classes of service and hence from there to the subscribers. This gives the administrators great flexibility in providing a tiered or tailored service for their subscribers.

FIG. 6 is a sample class hierarchy that can be used by the plug-in manager. This shows how the software can be organized so that the plug-in manager can install a pluggable software module into the system. The interfaces, such as FileOperations 601, define the functionality of the software module and the implementation is represented by FileOperationsImp1 604 class. The plug-in manager decides which implementation is loaded but the rest of the system does not need to know what particular implementation is used as it uses the interface. The second level of interfaces show how a pluggable software module is used by another module. MedaDataFileStore 614 is an interface defining a pluggable module. FileOperationImp1 604 module can use the plug-in manager to load an instantiation of this interface for its own use in the same way as another piece of the system would obtain an instantiation of FileOperations 601 interface. The implementation of MetaDataFileStore 614 is not shown as FileOperationsImp1 604 does not need to know which implementation it is using.

FileOperations 601 provides role-based access methods to retrieve the context specific operations classes (e.g. subscriber, service provider, and network operator) and provides Create/Read/Update/Delete/list methods to handle/update files in the file stores. In addition Input/Output streams can be obtained to the raw file data. This encapsulates all of a particular file's file system and metadata, by providing access/mutator methods for each instance of a FrameworkFile and a FileMetaData.

Security APIs (not shown) provide for the authentication of subscribers both for the web screens and the voice scripts. In addition, a complete set of Create/Read/Update/Delete methods are available for both the subscriber and COS information.

Security is split into two components. The high level component provides the authentication on subscriber level operations (e.g. changePin). The low level component provides the interface to the data store that holds security related information. This separation is intended to allow the source of the security data to be changed easily. The component split allows a data store component to be exchanged without affecting the high level functionality. Also, as there is an existing data store component, it allows the same set of tests to be run against the new component giving greater confidence in the changes.

The high level component is split into administrator and subscriber sections providing functional separation. This helps to prevent developers accidentally opening security holes by using APIs that are not appropriate for the task in hand. Note that typically an application developer would never see the data store component.

The records in the security module have a direct correlation with the Common Data. The subscriber records are keyed to the subscriber ID and the Class Of Service on the common key as shown in FIG. 3, sections 301 and 302. The security records are satellite records in the sense that they should not exist without the corresponding common data record. The security administration component provides a complete set of Create/Read/Update/Delete methods for both the COS and the subscriber.

The security subscriber component provides a set of authentication methods. Permitted authentication values are: username/email address/MSISDN+password, MSISDN+PIN number. Methods are provided for: password recovery based on the security question and answer. This will result in a message being sent via a reasonably secure method (e.g. SMS) that gives the subscriber password, updating the subscriber password and PIN, changing the security question and answer, and retrieving a record based on the username, to allow reverse lookups and the viewing of the security question.

The security alarm API (not shown) allows a component to raise or clear an alarm. This will be a pluggable component with the initial implementation providing an interface to the platform alarm system.

The AlarmManager API (not shown) allows for the raising and clearing of alarms. Each alarm will have a number which is globally unique across the system. These numbers are application specific and are defined in the appropriate functional specification. The number allows the cause and associated severity of alarm to be determined. Each alarm may have associated data (and integer), a string containing additional information, and optionally an associated task (defined as a string).

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A user interactive system (UIS) for controlling user access and navigation for a plurality of pluggable applications; said system comprising:
   a) a means for controlling interactive setup functions using a central core of UIS applications;
   b) a means for registering a plurality of individually designed UIS applications, said applications not necessarily provided by a common entity, said registering arranged to allow each of said applications to provide, to said UIS system, only those capabilities that said each application adds to said UIS system;
   c) a means for assigning each of the plurality of individually designed registered UIS applications to a call type;
   d) a means for assigning each of the plurality of individually designed registered UIS applications to a class of service;
   e) a means for maintaining for each user in a common data file information specific to said user;
   f) a means for allowing a user to select ones of said individually designed registered applications in accordance with permissions granted said user;
   g) a means for establishing communications connections in support of said selected applications using said interactive functions from said control core of UIS applications in accordance with commands from user selected individually designed applications;
   h) wherein at least one of said interactive functions is the provision of interactive responses with said user in accordance with a common theme for such interactions across a plurality of individually designed applications; and
   j) wherein the additional individually designed UIS applications are registered and can be assigned to a class of service after the user selects one of said individually designed registered application in accordance with permissions granted said user.

2. The system of claim 1 further comprising means for allowing said user to establish preferences for call setup scripts.

3. A system for controlling a user interactive system (UIS) that serves a plurality of users, the system comprising:
   a) a memory storing program instruction, the instruction when executed perform the method comprising;
   b) controlling interactive setup functions using a central core of UIS applications;
   c) registering a plurality of individually designed UIS applications, said applications not necessarily provided by a common entity, said registering arranged to allow each of said applications to provide, to said UIS system, only those capabilities that said each application adds to said UIS system;
   d) assigning each of the plurality of individually designed registered UIS applications to a call type;
   e) assigning each of the plurality of individually designed registered UIS applications to a class of service;
   f) maintaining for each user in a common data file information specific to said user;
   g) allowing a user to select ones of said individually designed registered applications in accordance with permissions granted said user;
   h) establishing communications connections in support of said selected applications using said interactive functions from said control core of UIS applications in accordance with commands from user selected individually designed applications;
   i) wherein at least one of said interactive functions is the provision of interactive responses with said user in accordance with a common theme for such interactions across a plurality of individually designed applications; and
   j) wherein the additional individually designed UIS applications are registered and can be assigned to a class of service after the user selects one of said individually designed registered application in accordance with permissions granted said user.

4. A method for controlling a user interactive system (UIS) serving a plurality of users, said method comprising:
   d) controlling interactive setup functions using a central core of UIS applications;

e) registering a plurality of individually designed UIS applications, said applications not necessarily provided by a common entity, said registering arranged to allow each of said applications to provide, to said UIS system, only those capabilities that said each application adds to said UIS system;

c) assigning each of the plurality of individually designed registered UIS applications to a call type;

d) assigning each of the plurality of individually designed registered UIS applications to a class of service;

e) maintaining for each user in a common data file information specific to said user;

f) allowing a user to select ones of said individually designed registered applications in accordance with permissions granted said user;

g) establishing communications connections in support of said selected applications using said interactive functions from said control core of UIS applications in accordance with commands from user selected individually designed applications;

h) wherein at least one of said interactive functions is the provision of interactive responses with said user in accordance with a common theme for such interactions across a plurality of individually designed applications; and i) wherein the additional individually designed UIS applications are registered and can be assigned to a class of service after the user selects one of said individually designed registered application in accordance with permissions granted said user.

5. The method of claim 4 wherein at least one of said interactive functions is the use by any of said individually designed applications of information maintained for said user.

6. The method of claim 4 wherein said communication connections may be selected from portions of applications from different individually designed applications.

7. The method of claim 4 wherein at least one of said interactive responses is via a web-based interaction directed to a web link by a selected one of said individually designed applications.

8. The method of claim 4 further comprising: billing for use of said applications by at least one of said central core of applications without regard to which application is selected by a user.

9. The system of claim 1, wherein the COS defines for said user the totality of available applications that said user can access, and further defines for said user one or more applications from the available applications that said user cannot access.

\* \* \* \* \*